United States Patent
Kelly et al.

(10) Patent No.: US 10,118,823 B2
(45) Date of Patent: Nov. 6, 2018

(54) METHOD OF THERMALLY-STABILIZING AN OXYGEN TRANSPORT MEMBRANE-BASED REFORMING SYSTEM

(71) Applicants: Sean M. Kelly, Pittsford, NY (US); Sadashiv M. Swami, Tonawanda, NY (US); John D. Peck, West Seneca, NY (US)

(72) Inventors: Sean M. Kelly, Pittsford, NY (US); Sadashiv M. Swami, Tonawanda, NY (US); John D. Peck, West Seneca, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/969,486

(22) Filed: Dec. 15, 2015

(65) Prior Publication Data

US 2017/0166445 A1 Jun. 15, 2017

(51) Int. Cl.
*C01B 3/38* (2006.01)
*C01B 13/02* (2006.01)

(52) U.S. Cl.
CPC .......... *C01B 3/382* (2013.01); *C01B 13/0251* (2013.01); *C01B 2203/0233* (2013.01);
(Continued)

(58) Field of Classification Search
CPC .................. C01B 2203/0233; C01B 3/382
See application file for complete search history.

(56) References Cited

U.S. PATENT DOCUMENTS

| 2,593,507 A | 4/1952 | Wainer |
| 2,692,760 A | 10/1954 | Flurshutz |

(Continued)

FOREIGN PATENT DOCUMENTS

| DE | 10330859 A1 | 2/2004 |
| DE | 102004038435 A1 | 2/2006 |

(Continued)

OTHER PUBLICATIONS

Oxygen Transport membranes for ultra-clean fuel production E.T. Robinson Fuel Chemistry Division Preprints, vol. 48(1), pp. 347-349, 2003.*

(Continued)

*Primary Examiner* — Douglas B Call
(74) *Attorney, Agent, or Firm* — Ralph J. Mancini

(57) ABSTRACT

A method of operating an oxygen transport membrane based reforming system employing one or more packs of thermally coupled panels of reformer tubes and oxygen transport membrane ("OTM") reactors close to thermo-neutral point is provided. The method produces syngas by converting a hydrocarbon-containing feed, such as natural gas in the reformer tubes of a pack by endothermic steam reforming reactions. The heat required for endothermic reforming reactions is provided by exothermic oxidizing reactions occurring inside the OTM reactors of the pack. At a thermo-neutral point the heat released by exothermic reactions matches the heat required to support endothermic reactions and heat losses in the pack. The method modulates the flow rate of hydrocarbon-containing feed and/or steam-to-carbon ratio of the combined feed to the pack to maintain the surface temperature of oxygen transport membrane reactors below a target maximum temperature. The syngas product oxygen-to-carbon ratio is maintained within a desired target (Continued)

range such that the OTM based reforming system is operated close to thermo-neutral point.

20 Claims, 7 Drawing Sheets

(52) U.S. Cl.
CPC .............. *C01B 2203/0244* (2013.01); *C01B 2203/0844* (2013.01); *C01B 2203/142* (2013.01)

(56) References Cited

U.S. PATENT DOCUMENTS

| | | | |
|---|---|---|---|
| 3,282,803 A | 11/1966 | Poepel et al. |
| 3,317,298 A | 5/1967 | Klomp et al. |
| 3,468,647 A | 9/1969 | Buyers et al. |
| 3,770,621 A | 11/1973 | Collins et al. |
| 3,861,723 A | 1/1975 | Kunz et al. |
| 3,868,817 A | 3/1975 | Marion et al. |
| 3,930,814 A | 1/1976 | Gessner |
| 3,976,451 A | 8/1976 | Blackmer et al. |
| 4,013,592 A | 3/1977 | Matsuoka et al. |
| 4,128,776 A | 12/1978 | Bonaquist et al. |
| 4,153,426 A | 5/1979 | Wintrell |
| 4,162,993 A | 7/1979 | Retalick |
| 4,175,153 A | 11/1979 | Dobo et al. |
| 4,183,539 A | 1/1980 | French et al. |
| 4,206,803 A | 6/1980 | Finnemore et al. |
| 4,261,167 A | 4/1981 | Paull et al. |
| 4,292,209 A | 9/1981 | Marchant et al. |
| 4,350,617 A | 9/1982 | Retalick et al. |
| 4,357,025 A | 11/1982 | Eckart |
| 4,365,021 A | 12/1982 | Pirooz |
| 4,373,575 A | 2/1983 | Hayes |
| 4,402,871 A | 9/1983 | Retalick |
| 4,609,383 A | 9/1986 | Bonaventura et al. |
| 4,631,238 A | 12/1986 | Ruka |
| 4,650,814 A | 3/1987 | Keller |
| 4,651,809 A | 3/1987 | Gollnick et al. |
| 4,720,969 A | 1/1988 | Jackman |
| 4,734,273 A | 3/1988 | Haskell |
| 4,749,632 A | 6/1988 | Flandermeyer et al. |
| 4,783,085 A | 11/1988 | Wicks et al. |
| 4,791,079 A | 12/1988 | Hazbun |
| 4,862,949 A | 9/1989 | Bell, III |
| 4,866,013 A | 9/1989 | Anseau et al. |
| 5,021,137 A | 6/1991 | Joshi et al. |
| 5,035,726 A | 7/1991 | Chen et al. |
| 5,061,297 A | 10/1991 | Krasberg |
| 5,143,751 A | 9/1992 | Richard et al. |
| 5,169,506 A | 12/1992 | Michaels |
| 5,169,811 A | 12/1992 | Cipollini et al. |
| 5,171,646 A | 12/1992 | Rohr |
| 5,185,301 A | 2/1993 | Li et al. |
| 5,205,990 A | 4/1993 | Lawless |
| 5,240,480 A | 8/1993 | Thorogood et al. |
| 5,259,444 A | 11/1993 | Wilson |
| 5,286,686 A | 2/1994 | Haig et al. |
| 5,298,469 A | 3/1994 | Haig et al. |
| 5,302,258 A | 4/1994 | Renlund et al. |
| 5,306,411 A | 4/1994 | Mazanec et al. |
| 5,342,705 A | 8/1994 | Minh et al. |
| 5,356,730 A | 10/1994 | Minh et al. |
| 5,417,101 A | 5/1995 | Weich |
| 5,432,705 A | 7/1995 | Severt et al. |
| 5,454,923 A | 10/1995 | Nachlas et al. |
| 5,478,444 A | 12/1995 | Liu et al. |
| 5,534,471 A | 7/1996 | Carolan et al. |
| 5,547,494 A | 8/1996 | Prasad et al. |
| 5,569,633 A | 10/1996 | Carolan et al. |
| 5,599,509 A | 2/1997 | Toyao et al. |
| 5,643,355 A | 7/1997 | Phillips et al. |
| 5,649,517 A | 7/1997 | Poola et al. |
| 5,707,911 A | 1/1998 | Rakhimov et al. |
| 5,750,279 A | 5/1998 | Carolan et al. |
| 5,804,155 A | 9/1998 | Farrauto et al. |
| 5,820,654 A | 10/1998 | Gottzman et al. |
| 5,820,655 A | 10/1998 | Gottzmann et al. |
| 5,837,125 A | 11/1998 | Prasad et al. |
| 5,855,762 A | 1/1999 | Phillips et al. |
| 5,864,576 A | 1/1999 | Nakatani et al. |
| 5,902,379 A | 5/1999 | Phillips et al. |
| 5,927,103 A | 7/1999 | Howard |
| 5,932,141 A | 8/1999 | Rostrop-Nielsen et al. |
| 5,944,874 A | 8/1999 | Prasad et al. |
| 5,964,922 A | 10/1999 | Keskar et al. |
| 5,975,130 A | 11/1999 | Ligh et al. |
| 5,980,840 A | 11/1999 | Kleefisch et al. |
| 6,010,614 A * | 1/2000 | Keskar .................. B01D 53/22 205/763 |
| 6,035,662 A | 3/2000 | Howard et al. |
| 6,048,472 A | 4/2000 | Nataraj et al. |
| 6,051,125 A | 4/2000 | Pham et al. |
| 6,070,471 A | 6/2000 | Westphal et al. |
| 6,077,323 A | 6/2000 | Nataraj et al. |
| 6,110,979 A * | 8/2000 | Nataraj .................... C01B 3/36 252/373 |
| 6,113,673 A | 9/2000 | Loutfy et al. |
| 6,114,400 A | 9/2000 | Nataraj et al. |
| 6,139,810 A | 10/2000 | Gottzmann et al. |
| 6,153,163 A | 11/2000 | Prasad et al. |
| 6,191,573 B1 | 2/2001 | Noda |
| RE37,134 E | 4/2001 | Wilson |
| 6,214,066 B1 | 4/2001 | Nataraj et al. |
| 6,214,314 B1 | 4/2001 | Nataraj et al. |
| 6,268,075 B1 | 7/2001 | Autenrieth et al. |
| 6,290,757 B1 | 9/2001 | Lawless |
| 6,293,084 B1 | 9/2001 | Drnevich et al. |
| 6,293,978 B2 | 9/2001 | Kleefisch et al. |
| 6,296,686 B1 | 10/2001 | Prasad et al. |
| 6,333,015 B1 | 12/2001 | Lewis |
| 6,352,624 B1 | 3/2002 | Crome et al. |
| 6,355,093 B1 | 3/2002 | Schwartz et al. |
| 6,360,524 B1 | 3/2002 | Drnevich et al. |
| 6,368,491 B1 | 4/2002 | Cao et al. |
| 6,382,958 B1 | 5/2002 | Bool, III et al. |
| 6,394,043 B1 | 5/2002 | Bool, III et al. |
| 6,402,156 B1 | 6/2002 | Schutz et al. |
| 6,402,988 B1 | 6/2002 | Gottzmann et al. |
| 6,430,966 B1 | 8/2002 | Meinhardt et al. |
| 6,468,328 B2 | 10/2002 | Sircar et al. |
| 6,475,657 B1 | 11/2002 | Del-Gallo et al. |
| 6,492,290 B1 | 12/2002 | Dyer et al. |
| 6,532,769 B1 | 3/2003 | Meinhardt et al. |
| 6,537,514 B1 | 3/2003 | Prasad et al. |
| 6,562,104 B2 | 5/2003 | Bool, III et al. |
| 6,592,731 B1 | 7/2003 | Lawless |
| 6,638,575 B1 | 10/2003 | Chen et al. |
| 6,641,626 B2 | 11/2003 | Van Calcar et al. |
| 6,652,626 B1 | 11/2003 | Plee |
| 6,681,589 B2 | 1/2004 | Brudnicki |
| 6,695,983 B2 | 2/2004 | Prasad et al. |
| 6,758,101 B2 * | 7/2004 | Valentine .................. B01J 8/02 73/195 |
| 6,783,750 B2 | 8/2004 | Shah et al. |
| 6,786,952 B1 | 9/2004 | Risdal et al. |
| 6,811,904 B2 | 11/2004 | Gorte et al. |
| 6,846,511 B2 | 1/2005 | Visco et al. |
| 6,916,570 B2 | 7/2005 | Vaughey et al. |
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |

(56) References Cited

U.S. PATENT DOCUMENTS

| | | |
|---|---|---|
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Kelly et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0141920 A1 | 10/2002 | Alvin et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1 | 7/2004 | Brule et al. |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1 | 3/2006 | Xue et al. |
| 2006/0127656 A1 | 6/2006 | Gopalan et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0029342 A1 | 2/2007 | Cross et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0245897 A1 | 10/2007 | Besecker et al. |
| 2007/0289215 A1 | 12/2007 | Hemmings et al. |
| 2007/0292342 A1 | 12/2007 | Hemmings et al. |
| 2007/0292742 A1 | 12/2007 | Hemmings et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0011672 A1 | 1/2008 | Shah |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1* | 7/2008 | Mundschau ......... B01D 69/141 252/373 |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger |
| 2009/0120379 A1 | 4/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0018394 A1 | 1/2010 | Ekiner et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0020192 A1 | 1/2011 | Baumann et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley, Jr. et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0067210 A1 | 3/2012 | Sane et al. |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2013/0258000 A1 | 10/2013 | Ohashi et al. |
| 2014/0044604 A1 | 2/2014 | Lane et al. |
| 2014/0056774 A1 | 2/2014 | Kelly et al. |
| 2014/0060643 A1 | 3/2014 | Martin et al. |
| 2014/0183866 A1 | 7/2014 | Kromer et al. |
| 2014/0206779 A1 | 7/2014 | Lackner et al. |
| 2014/0231351 A1 | 8/2014 | Wickramasinghe et al. |
| 2014/0319424 A1* | 10/2014 | Chakravarti ............... C01B 3/26 252/373 |
| 2014/0319427 A1 | 10/2014 | Chakravarti et al. |
| 2014/0323597 A1 | 10/2014 | Stuckert et al. |

(56) References Cited

U.S. PATENT DOCUMENTS

| | | | |
|---|---|---|---|
| 2014/0323598 A1 | 10/2014 | Chakravarti et al. | |
| 2014/0323599 A1 | 10/2014 | Chakravarti et al. | |
| 2015/0096506 A1* | 4/2015 | Kelly | B01J 8/067 122/32 |
| 2015/0098872 A1 | 4/2015 | Kelly et al. | |
| 2015/0226118 A1 | 8/2015 | Kelly et al. | |
| 2016/0001221 A1 | 1/2016 | Lu et al. | |
| 2016/0118188 A1 | 4/2016 | Wada | |
| 2016/0155570 A1 | 6/2016 | Shimada et al. | |
| 2016/0375411 A1* | 12/2016 | Lin | B01D 69/12 428/316.6 |

FOREIGN PATENT DOCUMENTS

| | | |
|---|---|---|
| EP | 0 663 231 A2 | 7/1995 |
| EP | 0 926 096 A1 | 6/1999 |
| EP | 0 984 500 A2 | 3/2000 |
| EP | 0 989 093 A2 | 3/2000 |
| EP | 1 504 811 A1 | 2/2005 |
| EP | 1717420 A1 | 11/2006 |
| EP | 1743694 A1 | 1/2007 |
| EP | 2 098 491 A1 | 9/2009 |
| EP | 2873451 A1 | 5/2015 |
| GB | 688657 | 3/1953 |
| GB | 689522 | 4/1953 |
| GB | 697377 | 9/1953 |
| GB | 713553 | 11/1954 |
| GB | 1199483 | 7/1970 |
| GB | 1 312 700 | 4/1973 |
| GB | 1348375 | 3/1974 |
| JP | 56-136605 | 10/1981 |
| WO | WO 97/41060 | 11/1997 |
| WO | WO 2011/020192 A1 | 11/1997 |
| WO | WO 9842636 | 10/1998 |
| WO | WO 0017418 | 3/2000 |
| WO | WO 0109059 A1 | 2/2001 |
| WO | WO 2004/063110 A2 | 7/2004 |
| WO | WO 2006/064160 A1 | 6/2006 |
| WO | WO 2007060141 | 5/2007 |
| WO | WO 2007/092844 A2 | 8/2007 |
| WO | WO 2007086949 | 8/2007 |
| WO | WO 2008024405 | 2/2008 |
| WO | WO 2009/027099 A1 | 3/2009 |
| WO | WO 2010052641 A2 | 5/2010 |
| WO | WO 2011083333 A1 | 7/2011 |
| WO | WO 2011121095 A2 | 10/2011 |
| WO | WO 2012118730 | 9/2012 |
| WO | WO 2013009560 A1 | 1/2013 |
| WO | WO 2013/062413 A1 | 5/2013 |
| WO | WO 2013089895 A1 | 6/2013 |
| WO | WO 2014/049119 A1 | 4/2014 |
| WO | WO 2014074559 A1 | 5/2014 |
| WO | WO 2014077531 A1 | 5/2014 |
| WO | WO 2014/107707 A2 | 7/2014 |
| WO | WO 2014/160948 A1 | 10/2014 |
| WO | WO 2014/176022 A1 | 10/2014 |

OTHER PUBLICATIONS

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf on Mar. 8, 2017.

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

Lee Rosen, Nick Degenstein; Minish Shah; Jamie Wilson; Sean Kelly; John Peck; and Max Christie; "Development of Oxygen Transport Membranes for Coal-Based Power Generation"; ScienceDirect (Available online at www.sciencedirect.com); Energy Procedia 4 (2011) pp. 750-755.

Friedemann Marschner et al., "Gas Production", Ullmann's Encyclopedia of Industrial Chemistry, Jun. 15, 2000, pp. 1-21, XP002253967.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-8 dual-phase composite hollow fiber membrane targeting chemical reactor applications; Journal of Membrane Science 389 (2012) 435-440.

Switzer et al., "Cost and Feasibility Study on the Praxair Advanced Boiler for the CO2 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

David Studer; Demonstration of a cylinder fill system based on solid electrolyte oxygen separator (SEOS) technology: Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

F. Bidrawn et al., "Efficient Reduction of CO2 in a Solid Oxide Electrolyzer" Electrochemical and Solid State Letters, vol. 11, No. 9, Jun. 20, 2008, pp. B167-B170, XP002644615.

Ebbesen et al.., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with CO2 Recovery", Final Report (Feb. 2002).

U.S. Department of Energy—Office of Fossil Energy and U.S. Department of Energy/NETL, "Evaluation of Innovative Fossil Fuel Power Plants with CO2 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC pp. 1-10.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a CO2 Recovery Power Plant by Burning Pulverized Coal in O2/CO2, Energy Convers. Mgmt., vol. 38, Supplement (1997) pp. S123- S127.

Ciacchi, et al., "Tubular zirconia-yttria electrolyte membrane technology for oxygen separation", Solid State Ionics 152-153, 2002, pp. 763-768.

* cited by examiner

METHOD OF THERMALLY-STABILIZING AN OXYGEN TRANSPORT MEMBRANE-BASED REFORMING SYSTEM

U.S. GOVERNMENT RIGHTS

The invention disclosed and claimed herein was made with United States Government support under Cooperative Agreement number DE-FC26-07NT43088 awarded by the U.S. Department of Energy. The United States Government has certain rights in this invention.

FIELD OF THE INVENTION

The present invention generally relates to a method for thermally-stabilizing an oxygen transport membrane-based reforming system for the production of syngas. The system comprises at least one reforming reactor pack assembly comprising two or more panel array modules, wherein each panel array module comprises a reforming panel comprising an array of reforming reactors and an oxygen transport membrane panel comprising an array of oxygen transport membrane (OTM) reactors. More particularly the method relates to operating the reforming reactor pack assembly close to thermo-neutral point by modulating the flow rate of hydrocarbon-containing process feed to the reforming reactors, or steam-to-carbon ratio of the combined feed fed to the reforming reactors, or flow rate of a cooling air stream, or temperature and flow rate of oxygen-containing stream, or combinations thereof to maintain OTM reactors surface temperature and syngas product oxygen-to-carbon ratio within desired target ranges.

BACKGROUND

Oxygen transport membrane (OTM) based reforming systems can be used for conversion of hydrocarbons to syngas product much like conventional steam methane reformer (SMR), partial oxidation (PDX) reactor, and autothermal reactor (ATR). However, in contrast to the conventional processes, OTM-based reforming systems' operation and process control can be substantially different. In an SMR plant, heat required for endothermic reforming reactions is provided by burning fuel outside of the reformer tubes, and/or by heat transfer from a hot gas stream which can be controlled independently from reformer fuel and steam process feed flow. In PDX and ATR plants, the fraction of process feed combusted to support the thermal demand in the reactor depends on the flowrate of oxygen provided to the reactor which can be controlled independently from process fuel and steam feed flow. However, in an OTM-based reforming system employing thermally-coupled reforming reactors and OTM reactors, the heat required for endothermic reforming reactions occurring inside the reforming reactors is provided by the exothermic oxidation reactions occurring inside the OTM reactors. The amount of heat released depends on the oxygen flux achieved through the action of the oxygen transport membranes. Unlike the PDX and ATR where gaseous oxygen is supplied as a separate feed, there is no direct flow control of oxygen input in OTM reactor. The oxygen input in OTM reactor will be governed by the properties of the oxygen transport membrane, operating temperature of the OTM reactor, and oxygen partial pressure gradient across the oxygen transport membrane. Thus, the OTM reactors in the OTM-based reforming system can produce excess heat causing the OTM reactor surface temperature to rise beyond a target maximum operating temperature, or can produce less than adequate heat to support endothermic reactions occurring in the reforming reactors while maintaining the OTM reactor temperature within a desired range to achieve the required oxygen flux for heat generation.

The present invention therefore, provides a method for thermally-stabilizing an oxygen transport membrane based reforming system through modulation of the flow rate of hydrocarbon-containing feed to the reforming reactors, steam-to-carbon ratio of the combined feed stream fed to the reforming reactors, the flow rate of cooling air, temperature and flow rate of oxygen-containing stream, or combinations thereof. The invention also relates to a method for thermally-stabilizing OTM-based reforming system through measurement and control of the syngas product oxygen-to-carbon ratio in a desired range such that the OTM-based reforming system is operated close to the thermo-neutral point.

SUMMARY OF THE INVENTION

The present invention in one or more aspects can be characterized as a method for thermally-stabilizing an oxygen transport membrane-based reforming system for the production of syngas. The system comprises at least one reforming reactor pack assembly comprising two or more panel array modules, wherein each panel array module comprises a reforming panel comprising an array of reforming reactors and an oxygen transport membrane panel comprising an array of catalyst-containing oxygen transport membrane reactors. The method comprises: partially reforming a combined feed stream comprising a hydrocarbon-containing feed stream and steam in the presence of heat in said reforming reactor to produce a partially-reformed synthesis gas stream comprising hydrogen, carbon monoxide, carbon dioxide, steam and unreformed hydrocarbon gas; feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream to produce an oxygen permeate and an oxygen-depleted retentate stream; reacting a portion of the partially-reformed synthesis gas stream with oxygen permeated through the at least one oxygen transport membrane reactor to produce a difference in oxygen partial pressure across the oxygen transport membrane reactor and generate a steam-containing heated reaction product stream and heat; transferring the heat generated as a result of the reaction via convection to the oxygen-depleted retentate stream and via radiation and convection to at least one catalyst-containing reforming reactor configured to produce a partially-reformed synthesis gas stream comprising hydrogen, carbon monoxide, carbon dioxide, steam and unreformed hydrocarbon gas, and reforming the unreformed hydrocarbon gas in the partially-reformed synthesis gas stream in the presence of one or more catalysts contained in the oxygen transport membrane reactor, wherein said method comprises feeding the combined feed stream to the reforming reactor at a flow rate and a steam-to-carbon ratio effective to thermally stabilize the temperature of said reactor to a target temperature range of from about 750° C. to about 1000° C.

The combined feed stream is fed to the reforming reactor at a flow rate and steam-to-carbon ratio effective to stabilize the temperature of the oxygen transport membrane reactor to a target temperature range of from about 750° C. to about 1000° C., in another embodiment in a range of from 900° C. to 1000° C. The combined feed stream has a steam-tocarbon ratio of from about 0.5 to about 3, in another embodiment from about 1.0 to about 2.5, and in another embodiment from about 1.0 to about 2.0.

In one embodiment the surface temperature of the oxygen transport membrane reactor is measured with at least one temperature measuring device selected from a thermocouple device located adjacent to at least one oxygen transport membrane tube on the oxygen-containing stream side (retentate side) of the oxygen transport membrane reactor or on outside wall of at least one oxygen transport membrane reactor, a pyrometer device located in view of at least one oxygen transport membrane tube on the retentate side of said oxygen transport membrane reactor, an optical camera-type device located in view of the at least one oxygen transport membrane tube on the retentate side of said oxygen transport membrane reactor or combinations thereof.

When the temperature of the oxygen transport membrane reactor falls below a predetermined target temperature in the target temperature range, the flow rate of hydrocarbon-containing feed or steam-to-carbon ratio of the combined feed stream to the reforming reactor is decreased for a time period effective to allow the OTM reactor temperature to recover to said predetermined target temperature within the target temperature range. The flow rate of hydrocarbon-containing feed or steam-to-carbon ratio of the combined feed stream is decreased to allow the OTM reactor temperature to increase at a rate of from about 0.5 ° C. per minute to about 10° C. per minute, in another embodiment at a rate of 1° C. per minute to about 5° C. per minute.

When the temperature of the oxygen transport membrane reactor increases above a predetermined target temperature in the target temperature range, the flow rate of hydrocarbon-containing feed or steam-to-carbon ratio of the combined feed to the reforming reactors is increased to allow the OTM reactor temperature to recover to the predetermined target temperature within the target temperature range. The flow rate of hydrocarbon-containing feed or steam-to-carbon ratio of the combined feed stream to the reforming reactors is increased to allow the OTM reactor temperature to decrease at a rate of from about 0.5 ° C. per minute to about 10° C. per minute, in another embodiment at a rate of 1° C. per minute to about 5° C. per minute.

An oxygen-to-carbon ratio is calculated using measured compositions of hydrocarbon -containing process feed and syngas product. The flow and temperature of the oxygen-containing stream to the reforming reactor pack assembly is controlled such that the oxygen-to-carbon ratio of the produced syngas (synthesis gas product) is maintained in a range of from about 0.45 to about 0.75. In one preferred embodiment, the combined feed stream is fed to the reforming reactor at a flow rate and a steam-to-carbon ratio effective to maintain the oxygen transport membrane reactor in a target temperature range of from about 950° C. to about 1000° C., and the flow and temperature of the oxygen-containing stream to the oxygen transport membrane reactor is controlled such that the oxygen-to-carbon ratio of the produced syngas is in a range of from about 0.45 to about 0.75.

In another aspect the present invention is directed to a method of stabilizing an oxygen transport membrane-based reforming system during operation, wherein said system comprises at least one reforming reactor pack assembly, said assembly comprising two or more panel array modules, wherein each panel array module comprises a reforming panel comprising an array of reforming reactors and an oxygen transport membrane panel comprising an array of catalyst-containing oxygen transport membrane reactors, the method comprising the steps of: partially reforming a combined feed stream comprising a hydrocarbon-containing feed stream and steam in the presence of heat in said reforming reactor to produce a partially-reformed synthesis gas stream comprising hydrogen, carbon monoxide, carbon dioxide, steam and unreformed hydrocarbon gas; feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream, to produce an oxygen permeate and an oxygen-depleted retentate stream, reacting a portion of the partially-reformed synthesis gas stream with oxygen permeated through the at least one oxygen transport membrane reactor to produce the difference in oxygen partial pressure across the at least one oxygen transport membrane reactor and generate a steam-containing heated reaction product stream and heat; transferring the heat generated as a result of the reaction via convection to the oxygen-depleted retentate stream and via radiation and convection to at least one catalyst-containing reforming reactor configured to produce a synthesis gas stream, and reforming the unreformed hydrocarbon gas in the partially-reformed synthesis gas stream in the presence of one or more catalysts contained in the oxygen transport membrane reactor and the heat to produce a synthesis gas product (syngas) stream, wherein the flow and temperature of the oxygen-containing stream to said oxygen transport membrane reactor is controlled such that the oxygen-to-carbon ratio of the produced syngas is in a target range of from about 0.45 to about 0.75, in another embodiment the oxygen-to-carbon ratio of the produced syngas is in a target range of from about 0.45 to 0.60, and in yet another embodiment the oxygen-to-carbon ratio of the produced syngas is in a target range of from about 0.55 to about 0.60.

When the oxygen-to-carbon ratio of the produced syngas falls below the target range, the temperature of the oxygen-containing stream is decreased for a time period effective to allow the oxygen-to-carbon ratio to recover to be in a desired target range.

When the oxygen-to-carbon ratio of the produced syngas rises above the target range, the temperature of the oxygen-containing stream is increased for a time period effective to allow the oxygen-to-carbon ratio to recover to said target range.

In yet another aspect the present invention is directed to a method for thermally-stabilizing an oxygen transport membrane-based reforming system during operation, wherein said system comprises at least one reforming reactor pack assembly, said assembly comprising two or more panel array modules, wherein each panel array module comprises a reforming panel comprising an array of reforming reactors and an oxygen transport membrane panel comprising an array of catalyst-containing oxygen transport membrane reactors, the method comprising the steps of: partially-reforming a combined feed stream comprising a hydrocarbon-containing feed stream and steam in the presence of heat in said reforming reactor to produce a partially-reformed synthesis gas stream comprising hydrogen, carbon monoxide, carbon dioxide, steam and unreformed hydrocarbon gas; feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream, to produce an oxygen permeate and an oxygen-depleted retentate stream; reacting a portion of the partially-reformed synthesis gas stream with oxygen permeated through the at least one oxygen transport membrane reactor to produce the difference in oxygen partial pressure across the at least one oxygen transport membrane reactor and generate a steam-containing heated reaction product stream and heat; transferring the heat generated as a result of the reaction via convection to the oxygen-depleted retentate stream and via radiation and convection to at least one catalyst-containing reforming reactor configured to produce a synthesis gas stream; reforming the unreformed hydrocarbon gas in the partially-reformed synthesis gas stream in the presence of one or more catalysts contained in the oxygen transport membrane reactor and the heat to produce a synthesis gas product stream; determining an oxygen-to-carbon ratio of the synthesis gas product stream from composition measurements of the hydrocarbon-containing feed stream and the synthesis gas product stream; wherein said method comprises feeding the combined feed stream to the reforming reactor at a flow rate and a steam-to-carbon ratio effective to maintain the oxygen-to-carbon ratio of the synthesis gas product stream in a target range of from about 0.45 to about 0.75.

BRIEF DESCRIPTION OF THE DRAWING

While the specification concludes with claims distinctly pointing out the subject matter that applicants regard as their invention, it is believed that the invention would be better understood when taken in connection with the accompanying figures wherein like numbers denote same features throughout and wherein:

DETAILED DESCRIPTION

Broadly speaking, the present invention may be characterized as a method for thermally-stabilizing an oxygen transport membrane-based reforming system for the production of syngas. The system comprises at least one reforming reactor pack assembly comprising two or more panel array modules, wherein each panel array module comprises a reforming panel comprising an array of reforming reactors and an oxygen transport membrane panel comprising an array of catalyst-containing oxygen transport membrane reactors. The method comprises: partially-reforming a combined feed stream comprising a hydrocarbon-containing feed stream and steam in the presence of heat in said reforming reactor to produce a partially-reformed synthesis gas stream comprising hydrogen, carbon monoxide, carbon dioxide, steam and unreformed hydrocarbon gas; feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream to produce an oxygen permeate and an oxygen-depleted retentate stream; reacting a portion of the partially-reformed synthesis gas stream with oxygen permeated through the at least one oxygen transport membrane reactor to produce a difference in oxygen partial pressure across the oxygen transport membrane reactor and generate a steam-containing heated reaction product stream and heat; transferring the heat generated as a result of the reaction via convection to the oxygen-depleted retentate stream and via radiation and convection to at least one catalyst-containing reforming reactor configured to produce a synthesis gas stream, and reforming the unreformed hydrocarbon gas in the partially-reformed synthesis gas stream in the presence of one or more catalysts contained in the oxygen transport membrane reactor, wherein said method comprises feeding the combined feed stream to the reforming reactor at a flow rate and a steam-to-carbon ratio effective to thermally-stabilize the temperature of said reactor in a target temperature range of from about 750° C. to about 1000° C. Each of these embodiments is discussed in the paragraphs that follow.

Figure 1:
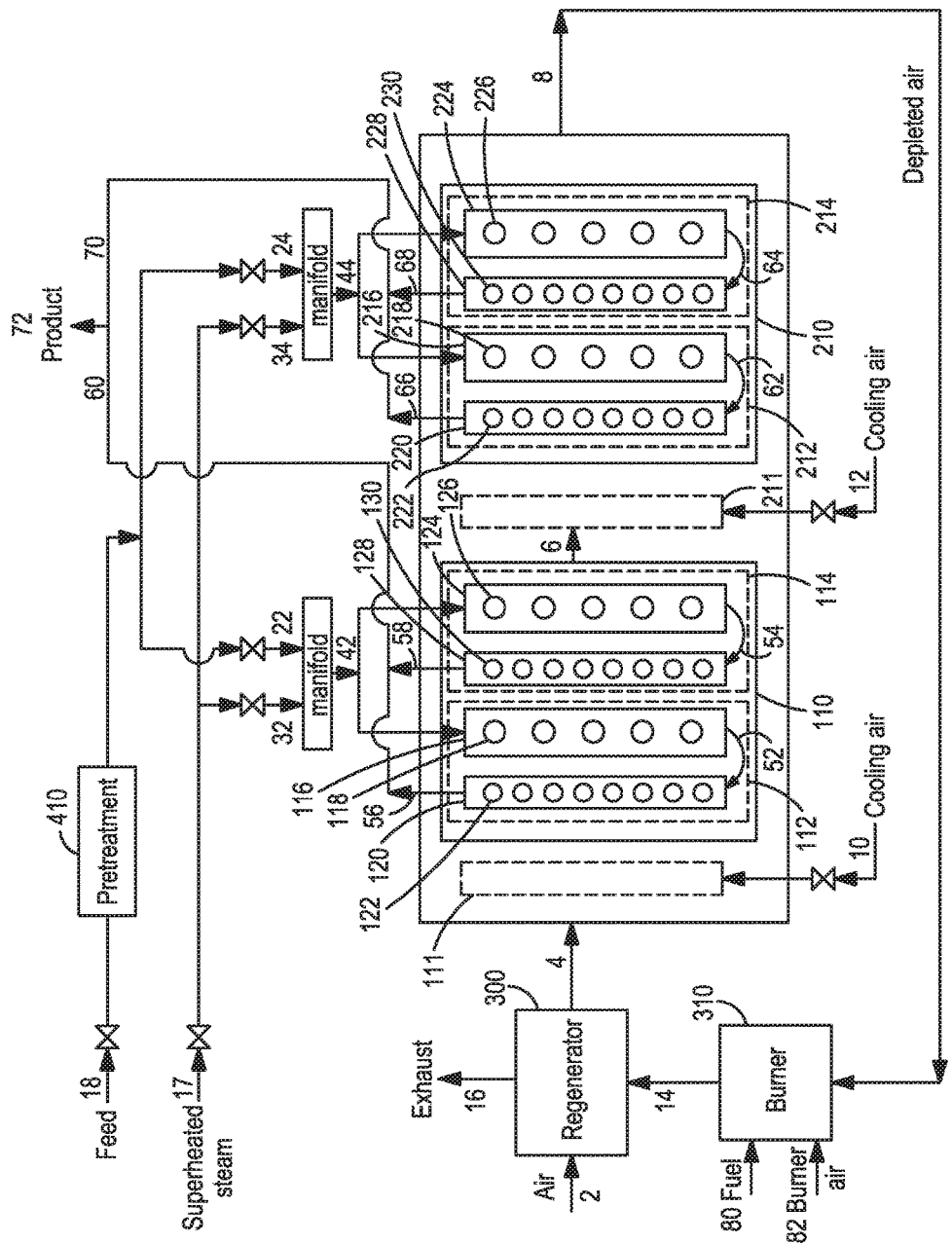
FIG. 1 is a simplified process flow diagram of an oxygen transport membrane-based reforming system

With reference to FIG. 1, for illustrative purposes an oxygen transport membrane-based reforming system for the production of syngas is shown to contain two reforming reactor pack assemblies 110 and 210. The reforming reactor pack assembly 110 contains two panel array modules 112 and 114, and the reforming reactor pack assembly 210 also contains two panel array modules 212 and 214, respectively. The panel array module 112 contains a reforming panel 116 containing an array 118 of reforming reactors and an oxygen transport membrane panel 120 containing an array 122 of catalyst-containing oxygen transport membrane reactors. Similarly each of the panel array modules 114, 212 and 214 contain a reforming panel (124, 216, 224) containing an array of reforming reactors (126, 218, 226) and an oxygen transport membrane panel (128, 220, 228) containing an array of oxygen transport membrane reactors (130, 222, 230).

The arrays of reforming reactors 118, 126 in the reforming panels 116 and 124, respectively partially reform a combined feed stream 42 comprising a hydrocarbon-containing feed stream 22 and steam 32 to produce partially-reformed synthesis gas streams 52, 54 comprising hydrogen, carbon monoxide, carbon dioxide, steam and unreformed hydrocarbon gas. The partially-reformed synthesis gas streams 52, 54 are routed to arrays of oxygen transport membrane reactors 122 and 130, respectively. Each of the oxygen transport membrane reactors in the arrays 122 and 130 is configured to separate oxygen from an oxygen-containing stream contacting the outside surface of the oxygen transport membrane reactor to produce an oxygen permeate on the inside and an oxygen-depleted retentate stream on the outside of the reactor. For example, the oxygen transport membrane reactors in the reforming reactor pack assembly 110 separate oxygen from a heated oxygen-containing stream 4; the permeated oxygen reacts with at least a portion of the partially-reformed synthesis gas stream routed into the oxygen transport membrane reactors to produce a difference in oxygen partial pressure across the oxygen transport membrane reactors and generate heat and syngas product streams 56 and 58, respectively. The heat generated as a result of exothermic oxidation reactions in the arrays 120 and 128 of oxygen transport membrane reactors is transferred via convection to the oxygen-depleted retentate stream and via radiation and convection to the arrays 116 and 124 of catalyst-containing reforming reactors to support the endothermic reforming reactions inside the reforming reactors. The oxygen transport membrane reactors operate at a higher temperature than the reforming reactors. Inadequate transfer of heat from an oxygen transport membrane reactor can result in the surface temperature of the oxygen transport membrane reactor exceed a desired target value. Insufficient release of heat in the oxygen transport membrane reactor can result in a decrease in the surface temperature that in turn could result in reduced oxygen flux. Therefore to thermally stabilize the reforming reactor pack assembly, the flow rate of the hydrocarbon-containing feed stream 42 or the steam-to-carbon ratio in the combined feed stream 42 or both can be modulated to maintain oxygen transport membrane reactor surface temperature at a target temperature range of from about 750° C. to about 1000° C., in another embodiment from about 850° C. to about 1000° C., and in yet another embodiment from about 950° C. to about 1000° C.

The heated oxygen-containing stream 4 serving as the source of oxygen for reactions within oxygen transport membrane reactors is formed for example by heating air stream 2 in a regenerator 300. Optionally a cooling air stream 10 can be introduced, using cooling air distribution panel 111, to mix with stream 4 to obtain a desired air side temperature; air side refers to the outside of the oxygen transport membrane reactors. The partially-oxygen-depleted air stream 6 (retentate) leaving pack 110 serves as the source of oxygen permeating across the oxygen transport membranes in pack 210. The temperature of partially-oxygen-depleted air stream 6 is further regulated using cooling air stream 12 and cooling air distribution panel 211. The retentate stream 8 leaving pack 210 can be further heated using a duct burner 310 type arrangement capable of burning a fuel 80. In some cases, burner air 82 can be used if the depleted air 8 does not have enough oxygen to support the combustion of fuel 80. Heat in resulting stream 14 is recovered in regenerator 300 and the cooled stream 16 is discharged.

The pack 210 in a manner similar to that described above for pack 110 produces syngas product 70 by reforming a combined feed stream 44 comprising a hydrocarbon feed stream 24 and steam 34 in the arrays of reforming reactors 218, 226 in the reforming panels 216 and 224, respectively. The partially-reformed synthesis gas streams 62, 64 routed to arrays of oxygen transport membrane reactors 222 and 230, respectively are converted into syngas product streams 66 and 68. The pack 210 can be controlled independently of pack 110. The combined feed flow rate 44 is modulated to control the temperature of catalyst-containing oxygen transport membrane reactors 222 and 230 at a target temperature setpoint within a preferred temperature range of from about 750 to about 1000° C. The combined feed flow rate of stream 44 is increased as temperature of OTM reactors increases above the target set point and the combined feed flow rate is decreased as temperature of OTM reactors falls below target temperature set point. The combined feed flow modulation can be done at constant steam-to-carbon ratio by modulating the flow rate of steam stream 34 and hydrocarbon-containing feed stream 24 such that steam-to-carbon ratio is maintained constant. In another embodiment, flow rate of stream 44 is modulated by modulating flow rates of steam stream 34 and hydrocarbon-containing feed stream 24 such that variable steam-to-carbon is achieved. In yet another embodiment, the flow rate of combined feed and/or flow rate and temperature of oxygen-containing stream to the pack are modulated to maintain the OTM reactor surface temperature within a target temperature range and an oxygen-to-carbon ratio of the synthesis gas product stream within a target range wherein the oxygen-to-carbon ratio is calculated from composition measurements of the hydrocarbon-containing feed and the synthesis gas product stream.

The hydrocarbon-containing feed streams 22 and 24 are derived from a hydrocarbon-containing feed 18 such as natural gas, a methane-containing process stream, a process tail-gas or mixtures thereof. The feed stream 18 may be pretreated in pretreatment unit 410 before mixing with steam and/or subjected to pre-reforming (not shown in FIG. 1) after mixing with steam forming feed streams 42 and 44. Steam 32 and 34 fed to the packs 110 and 210 is derived from superheated steam 17 generated in the balance of the syngas production plant (not shown in FIG. 1). Even though FIG. 1 shows only two reforming reactor pack assemblies, a typical OTM-based reforming system can contain only one reforming reactor assembly (pack) or several packs for example five packs. Also a pack in FIG. 1 is shown to contain only two panel array modules, however depending on the desired syngas production capacity a pack may contain as many as five to sixteen panel array modules. Primary reforming, which is an endothermic process, is conducted in the reforming panels containing arrays of reforming reactors. The OTM reactors in the oxygen transport membrane panel generate heat to support endothermic reactions in the reforming reactors by exothermic oxidation reactions between permeated oxygen and partially-reformed synthesis gas routed into the OTM reactors. The reforming reactors contain known reforming catalysts such as nickel-based catalysts. The OTM reactors can be configured to contain oxidation catalyst or reforming catalyst or both. The oxidation catalyst may be utilized as part of the oxygen transport membrane structure or as distinct elements inside the OTM reactor. The reforming catalyst may be utilized as part of the oxygen transport membrane structure or as distinct elements inside the OTM reactor.

In order to achieve target syngas production, the OTM-based reforming system can contain multiple reforming reactor pack assemblies (packs), each pack must be operated within a desired temperature range. Excess heat generated in a pack causes the OTM reactors surface temperature to rise, that increases the oxygen flux across the oxygen transport membrane since oxygen flux is a strong function of temperature. As oxygen flux increases, a larger fraction of partially-reformed synthesis gas is oxidized creating additional heat in OTM reactor, resulting in elevated OTM reactor surface temperature that could damage the reactor elements such as oxygen transport membrane, catalyst and seals. In contrast, as OTM temperature drops, oxygen flux decreases and hence the fraction of partially-reformed synthesis gas oxidized in OTM reactor decreases. Thus, reducing the heat release and further affecting the OTM reactor temperature. Ideally, OTM panels must be operated close to the thermo-neutral point. The thermo-neutral point is the point where the quantity of energy released in OTM reactors is equally matched with the energy requirement for endothermic steam reforming reactions in the reforming reactors. Therefore, it is important to know oxygen-to-carbon ratio at thermo-neutral point. In practice, the heat released in the OTM reactors should also be in sufficient amount to overcome any sensible heating requirements of gas feed streams, and heat losses from the process. Therefore, the reforming reactor pack assembly, also referred to as OTM pack, must be operated at slightly higher oxygen-to-carbon ratio, and hence slightly more net exothermic than ideal theoretical oxygen-to-carbon ratio at thermo-neutral point.

The oxygen-to-carbon ($O_{2,OTM}/C$) ratio calculation at thermo-neutral point is explained below using methane as the hydrocarbon in the feed to the reforming reactors as well as the unreformed hydrocarbon gas in the partially-reformed synthesis gas routed to the OTM reactors.

Endothermic reforming reaction in reforming reactors:

$$CH_4 + H_2O \rightarrow CO + 3H_2 \Delta H_{950°\,C.} = 227 \text{ kJ/mol}$$

Exothermic oxidation reaction in OTM reactors:

$$CH_4 + 2O_2 \rightarrow CO_2 + 2H_2O \Delta H_{950°\,C.} = -802 \text{ kJ/mol}$$

Assuming reaction extent for oxidation reaction is $\epsilon$ and corresponding overall methane conversion is $X_{CH4}$, then at thermo-neutral point (autothermal), $$802 \times \epsilon = 227 \times (X_{CH4} - \epsilon)$$
$$\epsilon = \frac{227 \times X_{CH4}}{802 + 227}$$
$$\epsilon = 0.22 \times X_{CH4}$$

Hence, taking into consideration reaction stoichiometry of oxidation reaction, $O_2/C$ at thermo-neutral point is $2\epsilon$, $0.44\,X_{CH4}$ $$\frac{O_{2,OTM}}{C} = 0.44 X_{CH4}$$

Assuming some efficiency loss, $\delta$, the OTM reactor control point at steady-state will be $$\frac{O_{2,OTM}}{C} = 0.44 X_{CH4} + \delta$$

Based on above equation, it is apparent that the $O_{2,OTM}/C$ at thermo-neutral point is function of methane conversion. The efficiency loss depends on the enthalpy of streams entering and leaving the control volume in which the endothermic and exothermic reactions are occurring, extent of these reactions and heat losses.

Figure 2:
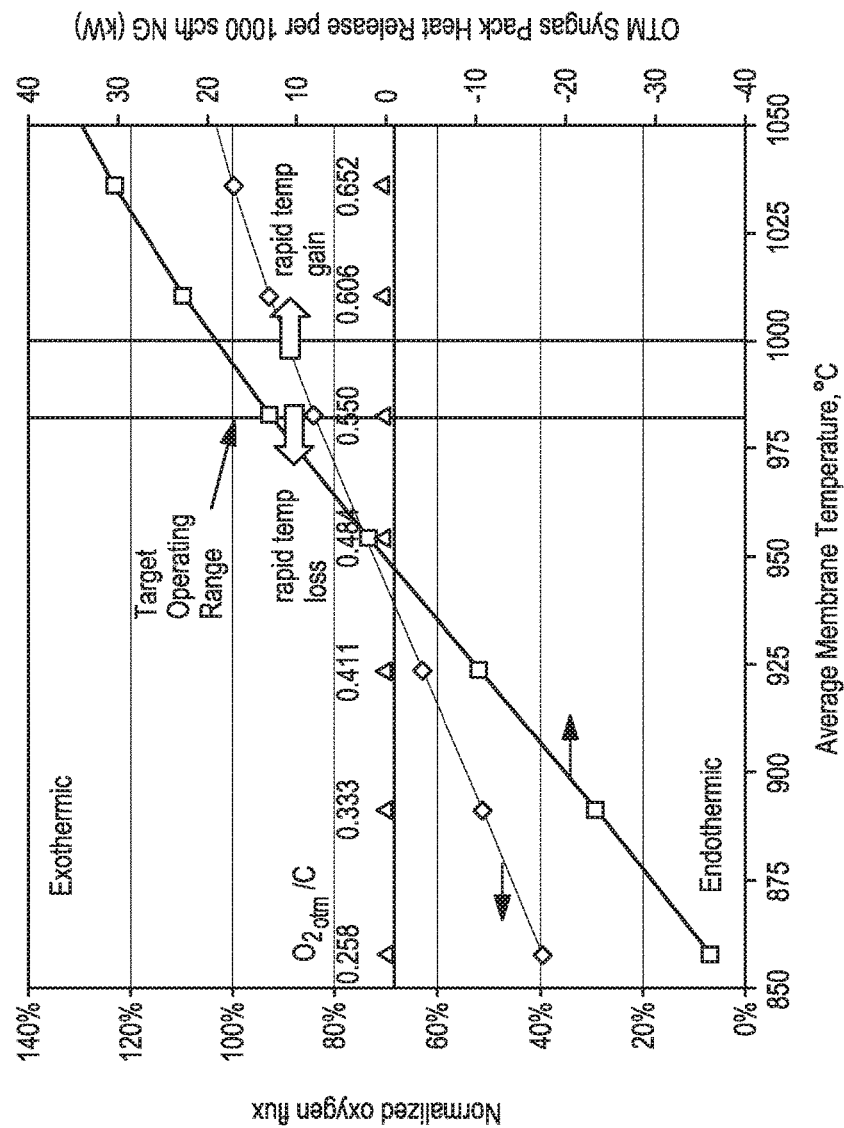
FIG. 2 shows effect of temperature on OTM oxygen flux and net heat released in an OTM pack.

The performance of a pack assembly depends on several factors including the oxygen flux characteristics of the oxygen transport membranes forming the OTM reactors. Assuming 1000 scfh methane as process feed to an OTM pack, heat and material balance calculations were performed for various OTM reactor surface temperatures using the oxygen flux data plotted in FIG. 2; the left y-axis is normalized oxygen flux and x-axis is OTM reactor surface temperature. The calculation results are also plotted in FIG. 2. The thermo-neutral point corresponds to a net heat release (right y-axis) of zero. The net heat release (y-axis) is greater than zero when the OTM reactor surface temperature and corresponding oxygen flux are greater than certain values and vice versa. At the higher temperatures the higher oxygen flux causes a greater amount of partially-reformed gas to be oxidized, hence corresponding $O_{2,OTM}/C$ has a higher value. Depending upon oxygen flux at a given temperature, net heat released in an OTM pack could be either positive (net exothermic) or negative (net endothermic). It can been seen that net heat released is almost equal to zero around $O_{2,OTM}/C$ of 0.44, the condition which is earlier explained using reforming and oxidation reactions. At lower temperature, oxygen transport membranes are almost ineffective and not able to generate enough heat required to drive endothermic reforming reactions which leads to overall reactor cooling and further loss of oxygen flux. This compounding effect leads to rapid temperature loss. On the other hand, at higher temperature, oxygen transport membrane's oxygen conduction capacity increases rapidly with temperature leading to large amount of heat being released in reactor which could cause rapid temperature increase beyond point of control, phenomenon known as "run-away" reaction.

Ideally, and for maximum efficiency, the OTM packs are operated as close to thermo-neutral point as possible. Operating the OTM packs significantly above or below the thermo-neutral point has an adverse effect on process efficiency. If OTM packs are operated at too high of an $O_{2,OTM}/C$ ratio, this can lead to temperature run-away scenario inside the OTM reactor since oxygen flux increases rapidly with increasing reactor temperature, which would further release excess heat and contribute to temperature rise. Operating OTM packs at high $O_{2,OTM}/C$ ratios will also lead to excess heat release and it could be detrimental to catalyst, seal, and membrane reliability as its strength will be compromised at higher temperature. Operating OTM packs at too low a $O_{2,OTM}/C$ ratio (below thermo-neutral point) can also cause operational issues. At very low $O_{2,OTM}$ primary reformer absorbs most of the heat available in the reactor and reduces OTM reactor temperature to the point at which OTM oxygen flux diminishes and membranes cease to flux. This could lead to loss of syngas production rate and also affect quality of syngas by altering chemical composition.

In order to be able to avoid thermal run-away or rapid reactor cooling, it is important to control OTM pack within a narrow $O_{2,OTM}/C$ range, ideally at thermo-neutral point but in reality slightly above this point to overcome system heat losses. However, unlike autothermal reactor or PDX, there is no direct way to control $O_{2,OTM}/C$ since oxygen rate is a system response which is very sensitive to oxygen transport membrane surface temperature.

Figure 3:
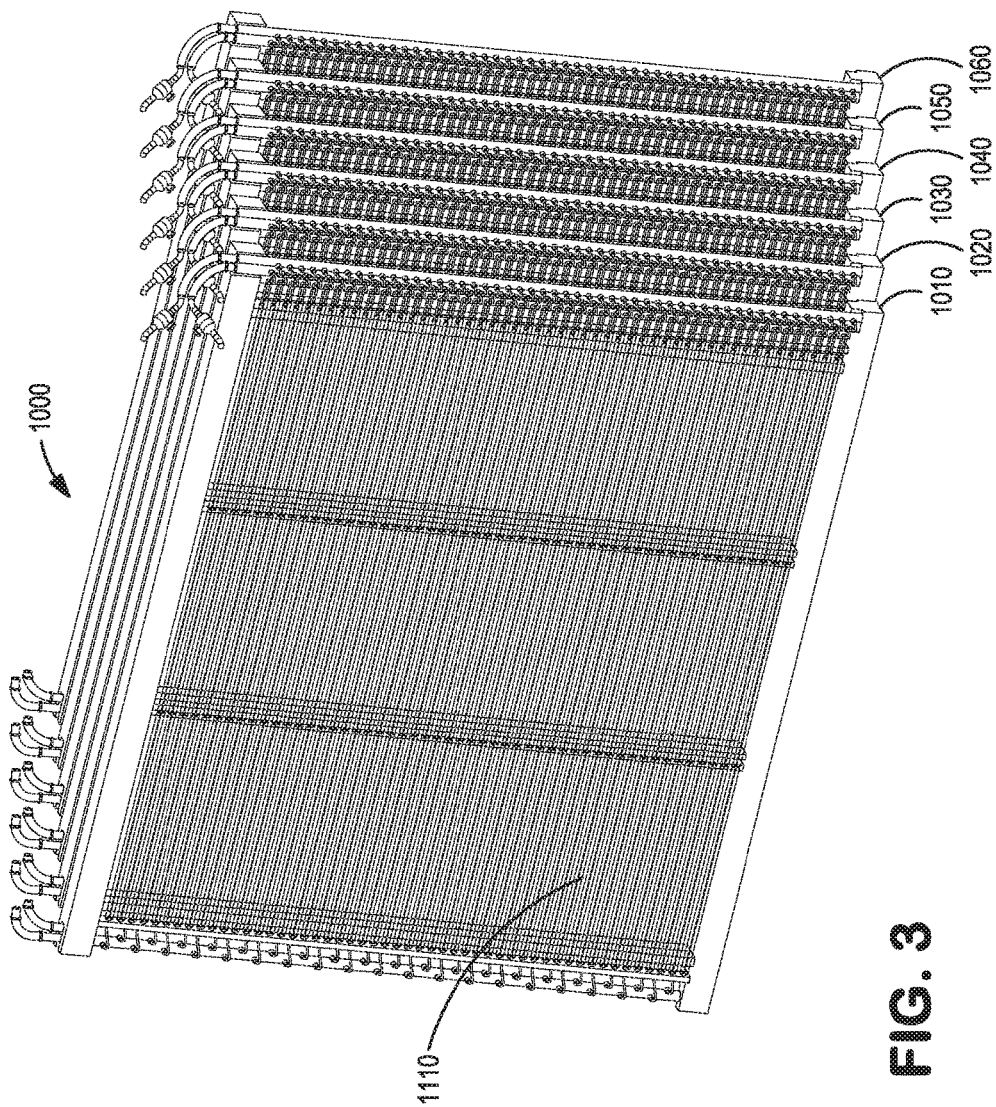
FIG. 3 is a schematic of a reforming reactor pack assembly.

With reference to FIG. 3, an oxygen transport membrane-based reforming reactor pack assembly 1000 containing six panel array modules, 1010, 1020, 1030, 1040, 1050, and 1060 is shown. Only the oxygen transport membrane panel 1110 containing an array of oxygen transport membrane reactors in the panel array module 1010 is labeled in FIG. 3, the corresponding reforming panel containing an array of reforming reactors is also not shown. The temperature of the oxygen transport membrane reactor can be measured with a variety of temperature measuring devices including, but not limited to, a thermocouple device, a pyrometer device, an optical camera-type device or combinations thereof. If a thermocouple is employed it is typically located adjacent to the oxygen-containing stream side of the oxygen transport membrane reactor, for example thermocouples can be positioned to measure surface temperature of oxygen transport membrane reactors in one or more panels; and at one or more locations within a panel. If a pyrometer is employed then it is typically located in view of the retentate side of said oxygen transport membrane reactor, similar will be the case for an optical camera-type temperature measuring device. One or more temperature measuring devices can be employed, ideally at least one per pack.

In accordance with the present invention the reforming reactor pack assembly is operated close to thermo-neutral point by modulating hydrocarbon containing feed flow or steam flow rate or combinations thereof such that the surface temperature of oxygen transport membrane reactors does not exceed a desired target value. For this purpose surface temperature of one or more oxygen transport membrane reactors in one or more oxygen transport membrane panels in the reforming reactor pack assembly can be measured. The control logic to test whether the surface temperature exceeds a desired target value can make use of all temperature measurements, or the average of all measurements at pack level, or the average of all measurements at oxygen transport membrane panel level. The test could also be based on some other measure such as median or some maximum percentile of all measurements at pack level or at panel level.

Figure 4:
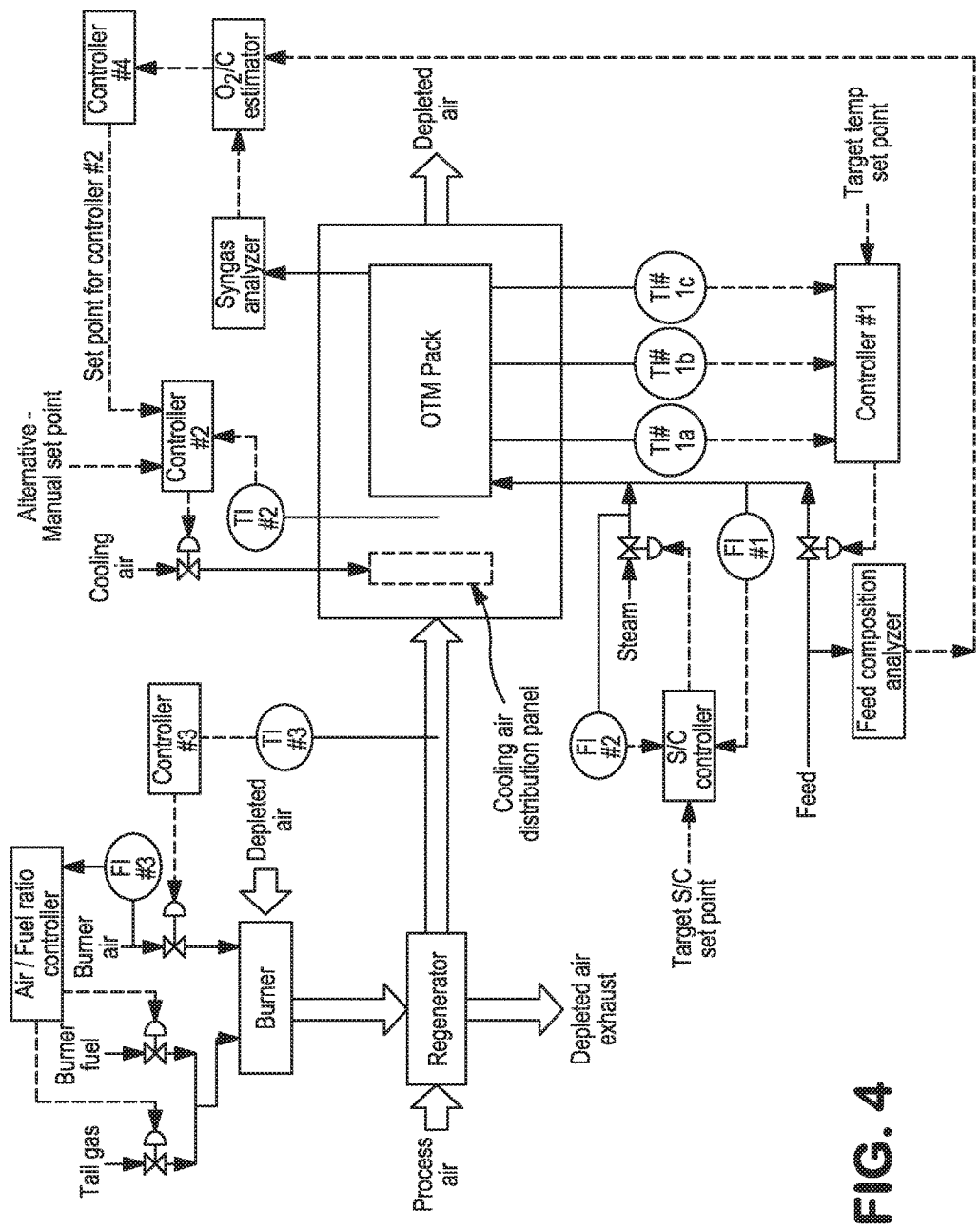
FIG. 4 is a block flow diagram of various control loops for thermally-stabilizing an oxygen transport membrane-based reforming system.

With reference to FIG. 4, Controller number (#) 1 can be configured to control the OTM reactors surface temperature in the OTM pack. Although three temperature sensor inputs are shown in FIG. 4, in practice there could be more than three or less than three temperature measurements, ideally at least one per panel. The OTM pack would be operated such that surface temperature of OTM reactors in the pack are maintained below a target maximum value (set point) by modulating flow rate of combined feed by adjusting flow rate of hydrocarbon-containing feed or flow rate of steam or both while maintaining desired steam-to-carbon ratio. For example as OTM reactor surface temperature starts to drop below a predetermined target set point within a target temperature range, typically 1000° C., the hydrocarbon-containing feed or steam flow rate is decreased, preferably both hydrocarbon-containing feed flow rate and steam flow rate is decreased while maintaining steam-to-carbon ratio constant so that OTM reactor surface temperature recovers to target value. On the other hand, as temperature starts to rise above the target set point, hydrocarbon-containing feed or steam flow rate is increased, preferably both hydrocarbon-containing feed flow rate and steam flow rate is increased while maintaining steam-to-carbon ratio constant until the OTM reactor surface temperature recovers to the target value. The target temperature range is generally from about 750° to about 1000° C.; in another embodiment from about 850° to about 1000° C., and in yet another embodiment from about 900° to about 1000° C. As mentioned above, the predetermined target temperature set point within said temperature range is typically 1000° C., but it can vary anywhere from about 940° to 1000° C. In one embodiment the predetermined target temperature is 950° C.

The combined flow rate of hydrocarbon-containing feed and steam can be either increased or decreased to allow the OTM reactor temperature to increase or decrease to within the target temperature range at a rate of from about 0.5° C. to about 10° C. per minute, in another embodiment from about 1° C. to about 5° C. per minute. The steam-to-carbon ratio of the combined feed stream is generally maintained from about 0.5 to about 3, in another embodiment from about 1.0 to about 2.5, and in yet another embodiment from about 1.0 to about 2.0. In one embodiment the combined flow rate of hydrocarbon-containing feed and steam can be increased or decreased by modulating the hydrocarbon-containing feed and steam flow rates such that the steam-to-carbon ratio is maintained constant, and in another embodiment the hydrocarbon-containing feed and steam flow rates are modulated such that the steam-to-carbon ratio varies during the modulation period.

In accordance with the present invention to achieve a desired syngas production rate at pack level, the OTM reactors surface temperatures and the syngas product $O_{2,OTM}/C$ ratio are maintained within their desired ranges. The $O_{2,OTM}/C$ ratio is calculated using the hydrocarbon-containing feed and syngas product composition data as described below. For this purpose the hydrocarbon-containing feed and syngas product are sampled and separately analyzed. The hydrocarbon-containing feed and/or steam flow to the pack, or cooling air flow at the inlet to the pack are modulated such that the reforming reactor pack assembly operates close to thermo-neutral point and the $O_{2,OTM}/C$ is maintained within a target range, typically of about 0.45 to about 0.75.

$O_{2,OTM}/C$ ratio calculation method

As explained previously, it is important to know $O_{2,OTM}/C$ ratio in order to operate the reforming reactor pack assembly with a consistent ratio of $O_{2,OTM}/C$, and hence a consistent syngas composition for the downstream user of the syngas. However, in practice it is challenging to estimate or measure in-situ oxygen transfer rate for ceramic membranes. Typical methods for estimating the oxygen across the membrane involve measuring the oxygen levels and the flow rates on the air-side of the system and calculating the oxygen deficit resulting from flow across membrane. With typical reactor train configurations having series-connected packs of membrane on the air side and staged cooling airflow temperature control, there are multiple air inputs to measure accurately and the changes in oxygen within a pack is small such that a very high accuracy oxygen measurement would be required. This method is challenging to use in practice effectively for anything other than coarse oxygen flow estimation. What is needed is a more accurate and responsive method that does not need multiple measurements of air flow rate with high precision and accuracy. Syngas composition measurements with Gas Chromatography (GC), Mass spectrometers (MS), or GC-MS can be used to infer oxygen from process-side mass balance, but accurate flow rate information is needed for these methods as well (which can be difficult with hot syngas exiting each pack), and water knock-out of the sample must be accounted for accurately to close the balance. This is very challenging to implement in anything but a controlled laboratory experiment; certainly not appropriate for syngas plant control.

To calculate the $(O_2/C)_{feed}$ of the hydrocarbon-containing feed, an accurate estimate of the water content of the feed, excluding added steam, is required. Samples can ideally be drawn at the source of hydrocarbon-containing feed such as methane, natural gas and the like, preferably after mixing with other hydrocarbon-containing process streams such as tail-gas and upstream of pretreatment operations such as desulfurization, but before steam addition and pre-reforming. Samples taken from that location are sufficiently dry since tail-gas and natural gas are low in moisture content.

The first step is to estimate $(O_2/C)_{feed}$ and $(H_2/C)_{feed}$ based on species mole fractions comprising the hydrocarbon-containing feed. The mole fractions can be obtained using GC, MS or GC-MS. As shown in FIG. 4 the feed gas sample is pulled from hydrocarbon-containing feed stream at the location before mixing with steam. The following equations are used to estimate $(O_2/C)_{feed}$ and $(H_2/C)_{feed}$.

$$O_2/C_{feed} = \frac{(0.5CO + CO_2 + O_2 + 0.5H_2O)}{(CO + CO_2 + CH_4 + 2C_2H_6 + 3C_3H_8 + 4C_4H_{10} + 5C_5H_{12})}$$

$$H_2/C_{feed} = \frac{(H_2 + 2CH_4 + 3C_2H_6 + 4C_3H_8 + 5C_4H_{10} + 6C_5H_{12})}{(CO + CO_2 + CH_4 + 2C_2H_6 + 3C_3H_6 + 4C_4H_{10} + 5C_5H_{12})}$$

The next step is the analysis of product syngas which can be either a wet sample or dry sample. The advantage of using this analysis method is that $O_{2,OTM}/C$ estimation is independent of product gas moisture content so that it does not matter whether wet sample or dry sample was chosen for analysis. In actual practice, the choice will be made based on ease of analysis. $O_{2,OTM}/C$ can be estimated using following equation:

$$\frac{\text{Oxygen across membrane}}{\text{unit carbon}} =$$

$$O_{2otm}/C_{product} = (\text{total } O_2/\text{total } C)_{product} - O_2/C_{feed} -$$

$$\frac{[(\text{total } H_2)_{product} - (\text{total } C)_{product} \times (H_2/C_{feed})]}{2(\text{total } C)_{product}} =$$

$$\frac{(0.5*CO + CO_2 + 0.5H_2O + O_2)}{(CO + CO_2 + CH_4)} - O_2/C_{feed} -$$

$$\frac{[(H_2 + H_2O + 2*CH_4) - H_2/C_{feed} * (CO + CO_2 + CH_4)]}{(2*(CO + CO_2 + CH_4))}$$

The air temperature of the oxygen-containing stream, measured at location TI #2 as shown in FIG. 4, can be used as controlled-variable in control loop #2 to achieve target $O_{2,OTM}/C$. The temperature set point for controller #2 is either manually adjusted or automatically generated using controller #4. The air temperature, TI #2, is decreased, by adding more cooling air or by reducing temperature TI #3, as $O_{2,OTM}/C$ starts to fall below target range and increased, by reducing cooling air or by increasing temperature TI #3, as $O_{2,OTM}/C$ starts to rise above target range. Since the temperature of at least one ceramic membrane tube is being controlled by modulating the flow of the hydrocarbon-containing feed, the $O_{2,OTM}/C$ where this control is reached, is dependent on the incident airflow and temperature, which dominates the thermal environment that the panel-arrays operate in. In general, when this environment is at elevated temperature, the resulting $O_{2,OTM}/C$ where the ceramic membrane temperature will come under control is generally lower, and when the environment is at a reduced temperature, the $O_{2,OTM}/C$ whereby the OTM comes into temperature control is generally higher. In one embodiment the $O_{2,OTM}/C$ ratio is from about 0.45 to about 0.75; in another embodiment from about 0.45 to about 0.60, and in yet another embodiment from about 0.55 to about 0.60.

The approaches described above to thermally stabilize an oxygen transport membrane-based reforming system were experimentally demonstrated using one reforming reactor pack assembly that contained six panel array modules. Each panel array module contained a reforming panel and an oxygen transport membrane panel. Each of the reforming panels contained 12 reforming reactors and each of the oxygen transport membrane panels contained 36 oxygen transport membrane reactors. Six thermocouples were positioned on six oxygen transport membrane reactors, one thermocouple per oxygen transport membrane panel to measure the oxygen transport membrane reactor surface temperature. The demonstration system contained a regenerator to preheat the air feed to the pack by recovering heat from the oxygen-depleted retentate stream leaving the pack, and a duct burner to further heat the air as needed. The experimental system also contained an electric steam boiler to generate steam for use during system start-up and steady-state operation. The option to generate steam by recovering heat from hot exhaust in a process boiler was also considered. A mass spectrometer (Thermo Scientific Prima Pro model) was used for syngas product analysis.

An oxygen transport membrane-based reforming system, unlike an ATR or PDX, cannot be transitioned easily from hot standby mode (no hydrocarbon feed to reforming reactors) to syngas operation mode without good estimates of flow rates for hydrocarbon-containing feed, steam, and oxygen streams to guide. In the case of OTM-based reforming system, there is no direct control for the oxygen input to the reforming reactor. The net oxygen input is determined by factors such as membrane surface temperature, composition of membrane active layers, gas transport properties of membrane porous substrate layer, etc. Prior information of expected oxygen flux for particular set of membrane material can be used to predict the OTM performance at target condition. In practice, oxygen flux data could be generated on small-scale samples in laboratory experiments using OTM membranes with similar composition and method of preparation. Based on expected oxygen flux at target operating condition, approximate flow rate of hydrocarbon-containing feed, steam or combined feed can be estimated. Table 1 summarizes normalized feed and product flow rate estimates prepared to assist the demonstration system operator. The feed and product flow rates were normalized by the maximum expected equilibrium flow rate at the conditions listed in Table 1. These flow rates were estimated assuming equilibrium conversion at target temperature and pressure for given set of oxygen flux, $O_{2,OTM}/C$ and steam-to-carbon (S/C) ratios. For these estimates, it was also assumed that each oxygen transport membrane panel contained an array of thirty six 2-ft long OTM reactors and each reforming panel contained an array of 12 reforming reactors. Methane and steam were assumed as feed to the reforming panel. The reforming reactor pack assembly was assumed to operate at a pressure of about 200 psig with partially-reformed synthesis gas leaving the reforming reactors at 875° C. and routed to the oxygen transport membrane reactors. The surface temperature of all of the oxygen transport membrane reactors in the pack was assumed to be 975° C. In addition to feed and product flow rates, other parameters—such as conversion, $H_2/CO$ ratio and syngas module—that define syngas product quality were also calculated. The flow rates listed in Table 1 were calculated for single panel array module, comprising an array of reforming reactors and an array of oxygen transport membrane reactors. For multiple panel array modules within a pack, the flow rates can be scaled up by simply multiplying the flow rate corresponding to single module with the total number of modules.

TABLE 1

| O2 flux (% of target) | O2/C | Flow & product quality | S/C | | | | | |
|---|---|---|---|---|---|---|---|---|
| | | | 0.5 | 1.0 | 1.5 | 2.0 | 2.5 | 3.0 |
| 30% | 0.45 | Total Feed flow | 8% | 10% | 13% | 15% | 18% | 20% |
| | | Overall CH4 conversion, % | 93.6% | 97.2% | 98.5% | 99.1% | 99.4% | 99.6% |
| | | H2/CO ratio | 2.4 | 2.7 | 3.1 | 3.4 | 3.7 | 4.0 |
| | | Syngas module | 2.0 | 2.1 | 2.1 | 2.1 | 2.1 | 2.1 |
| | | Syngas product flow | 17% | 20% | 22% | 25% | 27% | 30% |
| | 0.6 | Total Feed flow | 6% | 8% | 9% | 11% | 13% | 15% |

TABLE 1-continued

| O2 flux (% of target) | O2/C | Flow & product quality | S/C 0.5 | 1.0 | 1.5 | 2.0 | 2.5 | 3.0 |
|---|---|---|---|---|---|---|---|---|
| | | Overall CH4 conversion, % | 96.9% | 98.5% | 99.1% | 99.5% | 99.6% | 99.8% |
| | | H2/CO ratio | 2.3 | 2.6 | 3.0 | 3.3 | 3.6 | 3.9 |
| | | Syngas module | 1.8 | 1.8 | 1.8 | 1.8 | 1.8 | 1.8 |
| | | Syngas product flow | 13% | 15% | 17% | 19% | 21% | 23% |
| | 0.75 | Total Feed flow, slpm | 5% | 6% | 8% | 9% | 11% | 12% |
| | | Overall CH4 conversion, % | 98.5% | 99.2% | 99.5% | 99.7% | 99.8% | 99.9% |
| | | H2/CO ratio | 2.2 | 2.5 | 2.9 | 3.2 | 3.5 | 3.8 |
| | | Syngas module | 1.5 | 1.5 | 1.5 | 1.5 | 1.5 | 1.5 |
| | | Syngas product flow | 10% | 12% | 13% | 15% | 17% | 18% |
| 50% | 0.45 | Total Feed flow | 13% | 17% | 21% | 25% | 29% | 33% |
| | | Overall CH4 conversion, % | 93.6% | 97.2% | 98.5% | 99.1% | 99.4% | 99.6% |
| | | H2/CO ratio | 2.4 | 2.7 | 3.1 | 3.4 | 3.7 | 4.0 |
| | | Syngas module | 2.0 | 2.1 | 2.1 | 2.1 | 2.1 | 2.1 |
| | | Syngas product flow | 28% | 33% | 37% | 42% | 46% | 50% |
| | 0.6 | Total Feed flow | 9% | 13% | 16% | 19% | 22% | 25% |
| | | Overall CH4 conversion, % | 96.9% | 98.5% | 99.1% | 99.5% | 99.6% | 99.8% |
| | | H2/CO ratio | 2.3 | 2.6 | 3.0 | 3.3 | 3.6 | 3.9 |
| | | Syngas module | 1.8 | 1.8 | 1.8 | 1.8 | 1.8 | 1.8 |
| | | Syngas product flow | 22% | 25% | 28% | 31% | 34% | 38% |
| | 0.75 | Total Feed flow | 8% | 10% | 13% | 15% | 18% | 20% |
| | | Overall CH4 conversion, % | 98.5% | 99.2% | 99.5% | 99.7% | 99.8% | 99.9% |
| | | H2/CO ratio | 2.2 | 2.5 | 2.9 | 3.2 | 3.5 | 3.8 |
| | | Syngas module | 1.5 | 1.5 | 1.5 | 1.5 | 1.5 | 1.5 |
| | | Syngas product flow | 17% | 20% | 22% | 25% | 28% | 30% |
| 100% | 0.45 | Total Feed flow | 25% | 33% | 42% | 50% | 58% | 67% |
| | | Overall CH4 conversion, % | 93.6% | 97.2% | 98.5% | 99.1% | 99.4% | 99.6% |
| | | H2/CO ratio | 2.4 | 2.7 | 3.1 | 3.4 | 3.7 | 4.0 |
| | | Syngas module | 2.0 | 2.1 | 2.1 | 2.1 | 2.1 | 2.1 |
| | | Syngas product flow | 56% | 66% | 75% | 83% | 92% | 100% |
| | 0.6 | Total Feed flow | 19% | 25% | 31% | 38% | 44% | 50% |
| | | Overall CH4 conversion, % | 96.9% | 98.5% | 99.1% | 99.5% | 99.6% | 99.8% |
| | | H2/CO ratio | 2.3 | 2.6 | 3.0 | 3.3 | 3.6 | 3.9 |
| | | Syngas module | 1.8 | 1.8 | 1.8 | 1.8 | 1.8 | 1.8 |
| | | Syngas product flow | 43% | 50% | 56% | 62% | 69% | 75% |
| | 0.75 | Total Feed flow, slpm | 15% | 20% | 25% | 30% | 35% | 40% |
| | | Overall CH4 conversion, % | 98.5% | 99.2% | 99.5% | 99.7% | 99.8% | 99.9% |
| | | H2/CO ratio | 2.2 | 2.5 | 2.9 | 3.2 | 3.5 | 3.8 |
| | | Syngas module | 1.5 | 1.5 | 1.5 | 1.5 | 1.5 | 1.5 |
| | | Syngas product flow | 35% | 40% | 45% | 50% | 55% | 60% |

Before starting methane and steam feed flows to the development-scale system reforming reactor pack assembly, the entire pack was heated to an operating temperature of from about 800° C. to about 850° C. This was achieved by preheating the process air and feeding preheated air to the pack. During this air side warm-up step, the array of reforming reactors and the array of oxygen transport membrane reactors were purged with nitrogen. On commercial units, any inert gas or steam could be used as purge medium. The air side pressure in the pack was maintained slightly below ambient pressure during entire reactor warm-up period as well as during normal operation. A blower on inlet-end and an eductor system on outlet-end were used to feed process air and overcome air-side pressure drop. On commercial units, a combination of Forced Draft (FD) fan and Induced Draft (ID) fan will be used to supply process air.

In an oxygen transport membrane-based reforming system (OTM train) containing multiple packs, each pack can be started-up, or shut-down independently. Ideally, the packs in the front of OTM train should be started first which will generate heat locally, and preheat air and help heat subsequent packs in the direction of air flow. The start-up phase was initiated by increasing methane flow in increments of 5% of final target value corresponding to steady-state operation. During this phase corresponding amount of steam required to maintain target steam-to-carbon (S/C) ratio was fed to form the combined feed to the pack. Alternatively, the transition from purge mode to syngas mode was achieved by initiating controller number 1 and ramping up temperature set point at certain ramp rate of about 0.5° C. per minute to 10 ° C. per minute.

The control logic shown as controller number 1 in FIG. 4 can be implemented using known Proportional-Integral-Derivative (PID). As described above the demonstration system was operated by increasing combined methane and steam feed flow to the reforming reactors when the OTM reactor surface temperature increased, and the combined methane and steam feed flow was decreased when the OTM reactor surface temperature dropped below a target value. The target temperature from flow modulation was achieved at constant steam-to-carbon ratio. It is desirable to maintain constant steam-to-carbon ratio during flow modulation to get consistent syngas composition especially at steady-state operation. The variable steam-to-carbon ratio, along with feed flow modulation, could be used for control purpose especially during initial transition phase when very rapid temperature changes could occur especially during purge mode to hydrocarbon/steam mode. As flow rate of methane was modulated, steam flow rate was also adjusted to maintain target steam-to-carbon (S/C) ratio (operator input to the controller). As mentioned before six temperature measurements were made (one per OTM panel), and the maximum value of the six temperature measurements was used as control variable.

Figure 5:
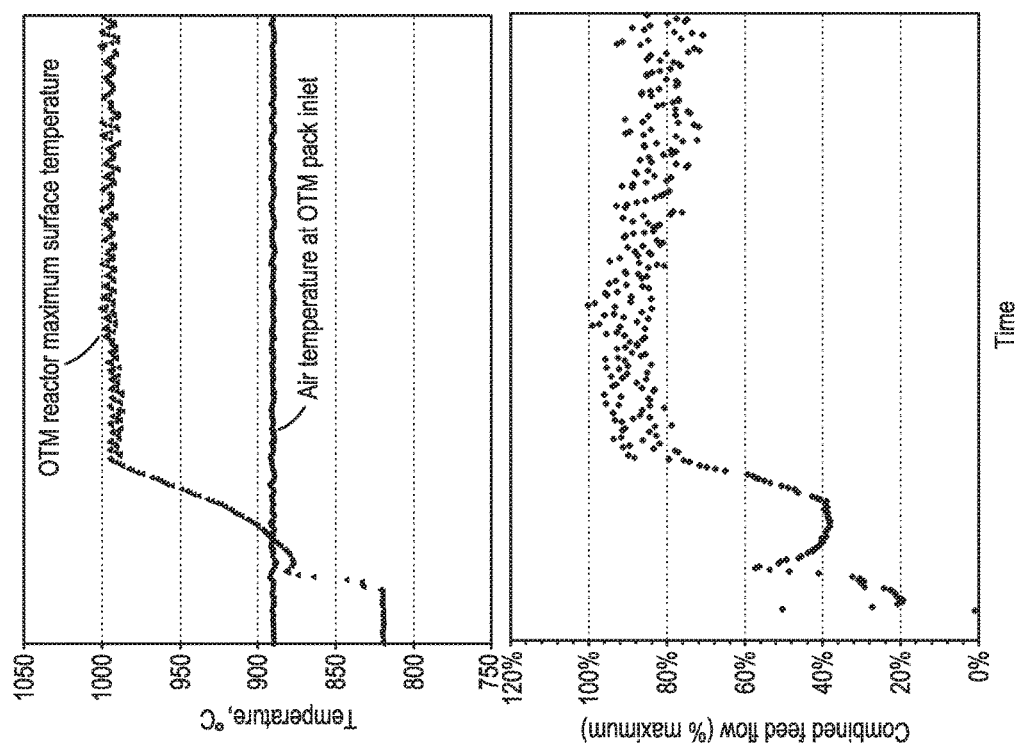
FIG. 5 is a plot of temperatures and hydrocarbon-containing combined feed flow during the startup and steady-state phase.

During transition state from hot standby mode (purge mode) to syngas production mode, controller 1 can be initialized with a temperature set point 10° C. to 20° C. below the desired steady-state target value. The initial set point value was set at the maximum temperature in the pack during hot standby mode. The OTM reactors started conducting oxygen as soon as the partially-reformed synthesis gas entered the OTM reactors from the reforming reactors in the panel array module. The exothermic reactions inside the OTM reactors caused the OTM reactor surface temperature to increase further enhancing oxygen flux across membrane. During the transition state, target set point temperature was ramped up from a lower value during hot standby mode (around 800° C.) to final target value of approximately 1000° C. at a ramp rate in the range of from about 0.5° C. per minute to about 10° C. per minute. FIG. 5 shows the OTM reactor surface temperature and air side temperature profiles and corresponding combined methane and steam flow rates during transition from hot standby mode to steady-state oxygen flux mode. Both temperature and combined flow rate are plotted as function of time. During the transition, the surface temperature of OTM reactors was raised from 820° C. to 1000° C. During the transition state, flow rate of combined feed containing methane and steam was increased from zero to a final value at which the OTM reactor surface temperature stayed around 1000° C.

Once steady-state target temperature of 1000° C. was achieved, controller number 1 maintained the temperature within ±5° C. of target value. When the maximum OTM reactor surface temperature increased above target value, the flow rate of combined feed (methane and steam) was increased, while maintaining steam-to-carbon ratio constant. When the maximum temperature dropped below the target value, the combined feed (methane and steam) flow rate was decreased while maintaining steam-to-carbon ratio constant.

The overall $O_{2,OTM}/C$ should be maintained close to theoretical thermo-neutral point. Because of heat losses, most practical systems would operate at $O_{2,OTM}/C$ value which is slightly above the theoretical value, generally in the range of 0.45-0.75. In one embodiment, $O_{2,OTM}/C$ is controlled by controlling total carbon in hydrocarbon-containing stream and oxygen permeation in the oxygen transport membrane reactors from oxygen-containing stream. Although carbon addition can be controlled by controlling flow rate and composition of hydrocarbon-containing feed, there is no direct control for oxygen flow from oxygen-containing stream to permeate side of oxygen transport membrane reactor. In order to complete the transition from hot standby mode to steady-state oxygen flux mode at maximum syngas production capacity maintaining surface temperature of all the oxygen transport membrane reactors within narrow temperature range, ideally at same target temperature, overall $O_{2,OTM}/C$ should be maintained close to a desired thermo-neutral point.

In the absence of measurement of oxygen addition to reforming pack, the method of measuring $O_{2,OTM}/C$ based on feed and product syngas composition and controlling $O_{2,OTM}/C$ in target range by controlling inlet temperature of the air or oxygen-containing-stream is disclosed in this invention. The composition of hydrocarbon-containing feed to reforming pack and syngas product from reforming pack could be measured using commercially available analytical techniques such as Gas Chromatography (GC), Mass Spectrometry (MS) or Combination of Gas Chromatography and Mass Spectrometry. Preferably, Mass Spectrometer would be used due to its ability to analyze samples at faster rates and capabilities of Mass Spectrometer to analyze multiple samples on a single analytical unit. Syngas composition could be measured before or after steam knock-out from product stream.

In order to control $O_{2,OTM}/C$ at target range, control logic consisting two controllers, controller number 2 and 4 as shown in FIG. 4, can be implemented. $O_{2,OTM}/C$ would be controlled by manipulating the temperature of oxygen-containing stream. The temperature of oxygen-containing stream would be measured at the location TI #2 as shown in FIG. 4. TI #2 sensor is placed in oxygen-containing stream after providing sufficient length for mixing cooling air with oxygen-containing air stream from previous pack. Each oxygen transport membrane pack can have optional cooling air distribution panel as shown in FIG. 4. For the first pack, the inlet temperature is adjusted as necessary by manipulating either cooling air flow rate if cooling air distribution panel is used or by manipulating burner duty using controller number 3 shown in FIG. 4. For the subsequent packs, the inlet temperature of the oxygen-containing stream is adjusted by manipulating cooling air flow using controller number 2. The control variable for controller number 2 would be desired $O_{2,OTM}/C$ value which can be manually set or automatically generated using another controller, controller number 4 in FIG. 4.

Figure 6:
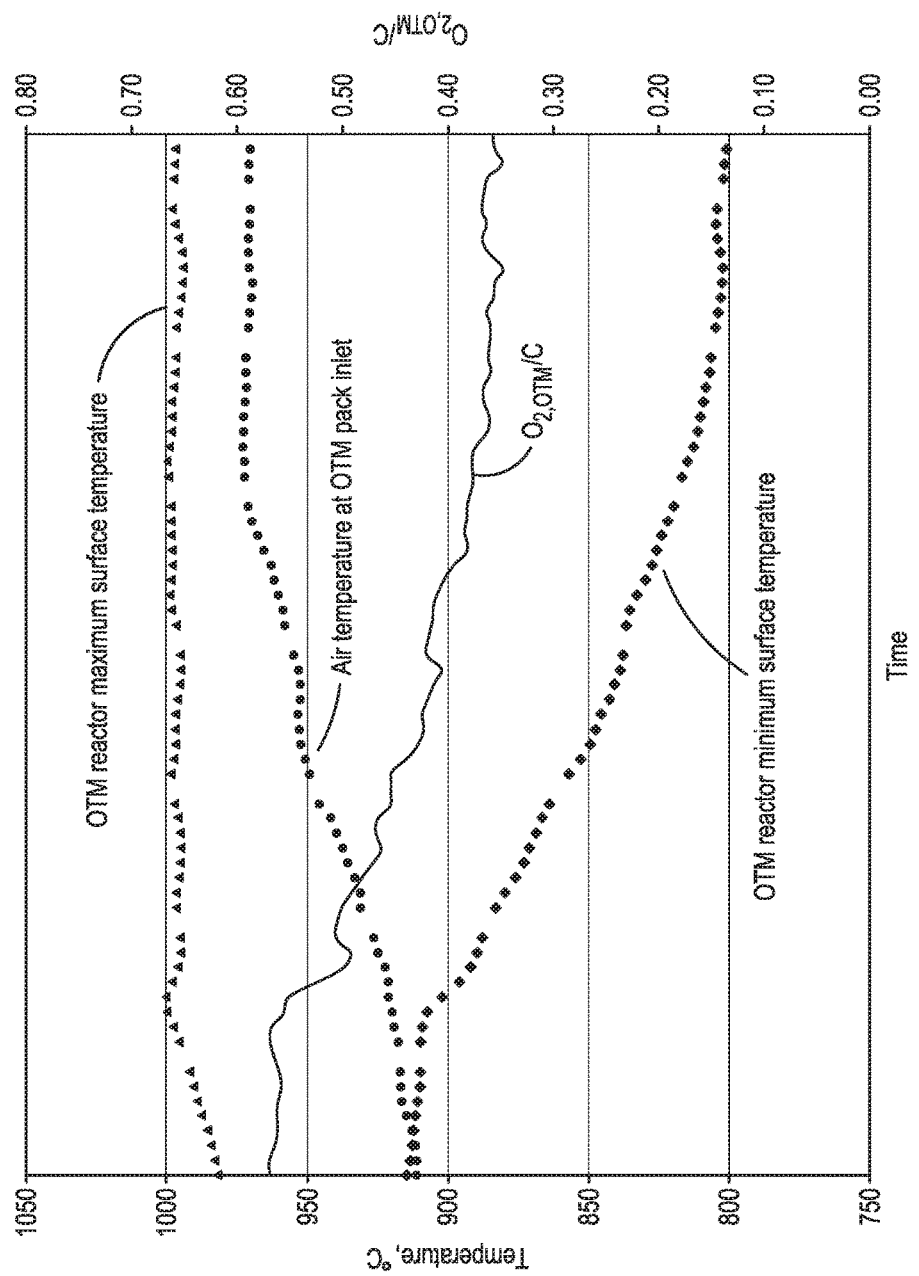
FIG. 6 is a plot of OTM surface temperatures and $O_{2,OTM}/C$ ratio wherein temperature of inlet air to OTM pack was increased.

The importance of controlling pack-level $O_{2,OTM}/C$ to a value closer to thermo-neutral point was experimentally demonstrated. The results of that test are shown in FIG. 6. The test was done on the single reforming pack as described above. The maximum value of six OTM panel temperature measurements was used for the control purpose. The reforming pack assembly was brought to target temperature of 1000° C. by modulating methane and steam feed flow rate using controller number 1 while maintaining pack-level $O_{2,OTM}/C$ around 0.55. As expected in any practical system, the measured temperatures of the six OTM panels in the reforming pack showed panel to panel temperature differences, however, all the six panels operated within target temperature range. Once target temperature of 1000° C. was achieved on reforming pack, air temperature measured at location TI #2 (FIG. 4), was increased without controlling $O_{2,OTM}/C$ in an attempt to prove the significance of maintaining $O_{2,OTM}/C$. As air inlet temperature was increased, the syngas product $O_{2,OTM}/C$ continued to decrease, dropping below the ideal thermo-neutral point of 0.44. However, during this transition, the maximum OTM panel temperature was maintained in the desired range by modulating flow rate of combined methane and steam stream at target steam-to-carbon (S/C) ratio. However, when secondary $O_{2,OTM}/C$ control loop was not used, then some of the oxygen transport membrane reactors fell below target temperature range. As shown in FIG. 6 one of the panel temperature continued to drop as $O_{2,OTM}/C$ fell below target range 0.45-0.6 and reached almost 800° C. as $O_{2,OTM}/C$ ratio dropped below thermo-neutral point.

Figure 7:
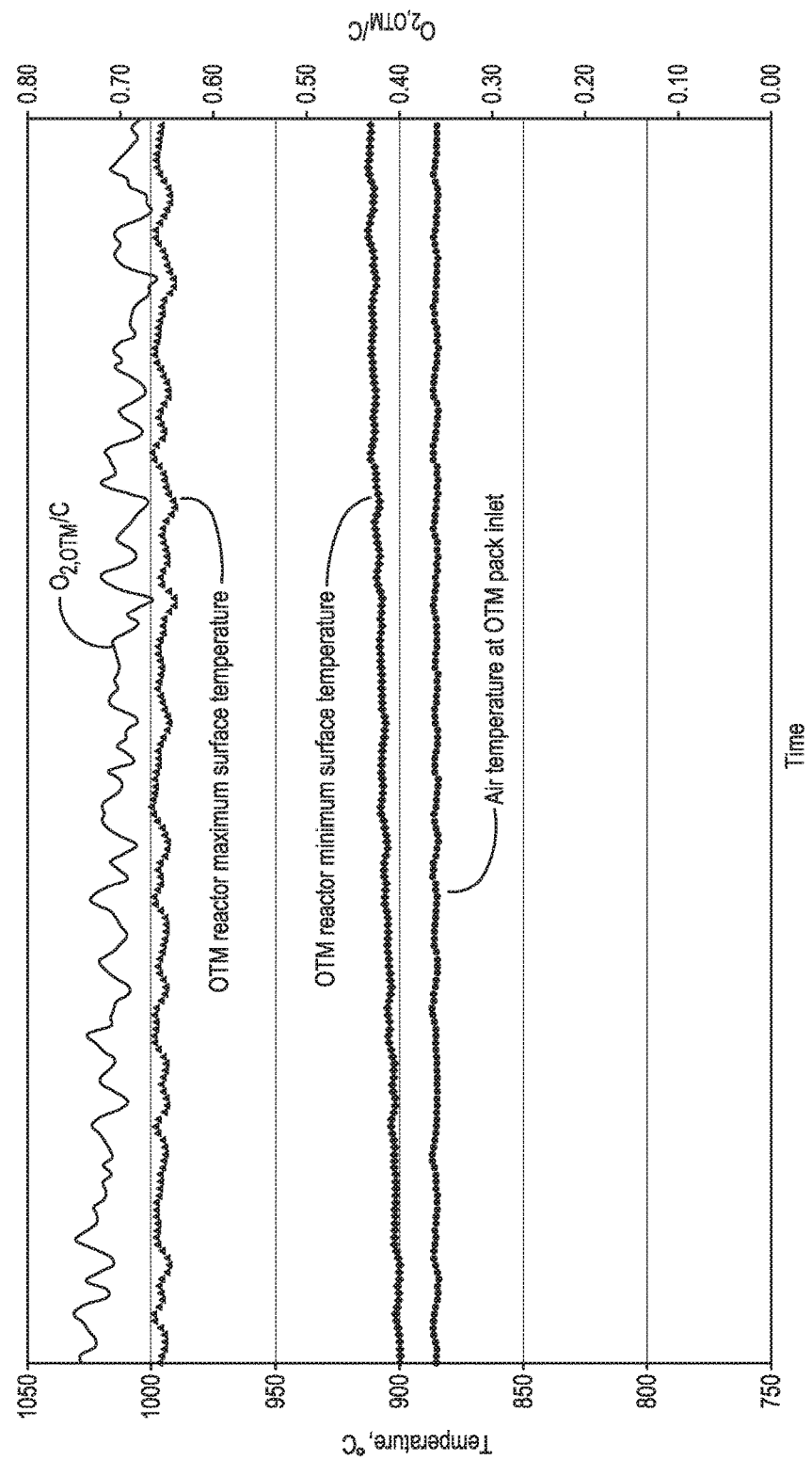
FIG. 7 is a plot of OTM surface temperatures and $O_{2,OTM}/C$ ratio during another steady-state period wherein both feed flow modulation and $O_{2,OTM}/C$ ratio control loops were active

Another test was conducted in which both the primary flow modulation and secondary $O_{2,OTM}/C$ ratio control loops were used for thermally-stabilizing six-panel OTM pack. The results of that test are shown in FIG. 7, the maximum and minimum surface temperatures of six OTM panels were within 900-1000° C. Unlike the previous test in which only combined-feed modulation control loop was used, when both control loops were used OTM pack was controlled in target temperature range and at a $O_{2,OTM}/C$ value which was also within target range.

While the inventions herein disclosed have been described by means of specific embodiments and processes associated therewith, numerous modifications and variations can be made thereto by those skilled in the art without departing from the scope of the invention as set forth in the appended claims or sacrificing all of its features and advantages.

We claim:

1. A method for thermally-stabilizing an oxygen transport membrane-based reforming system for the production of syngas, said system comprises at least one reforming reactor pack assembly, said assembly comprising two or more panel array modules, wherein each panel array module comprises a reforming panel comprising an array of reforming catalyst containing reforming reactors and an oxygen transport membrane panel comprising an array of catalyst-containing oxygen transport membrane reactors, said method comprising:

partially reforming a combined feed stream comprising a hydrocarbon-containing feed stream and steam in the presence of heat in said reforming catalyst containing reforming reactors to produce a partially-reformed synthesis gas stream comprising hydrogen, carbon monoxide, carbon dioxide, steam and unreformed hydrocarbon gas;

feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream to produce an oxygen permeate and an oxygen-depleted retentate stream;

reacting a portion of the partially-reformed synthesis gas stream with oxygen permeated through the at least one oxygen transport membrane reactor to produce a difference in oxygen partial pressure across the oxygen transport membrane reactor and generate a steam-containing heated reaction product stream and heat;

transferring the heat generated as a result of the reaction via convection to the oxygen-depleted retentate stream and via radiation and convection to at least one catalyst-containing reforming reactor configured to produce a synthesis gas product stream; and reforming the unreformed hydrocarbon gas in the partially-reformed synthesis gas stream in the presence of one or more catalysts contained in the oxygen transport membrane reactor;

wherein said method comprises modulating the flow rate of the combined feed stream to the reforming reactors by adjusting the flow rate of hydrocarbon-containing feed, or the flow rate of steam, or the flow rate of both the hydrocarbon-containing feed and the flow rate of steam while maintaining a steam-to-carbon ratio effective to thermally stabilize the temperature of said oxygen transport membrane-based reforming system in a target temperature range from about 750° C. to about 1000° C.

2. The method of claim 1 wherein the steam-to-carbon ratio of the combined feed stream is from about 0.5 to about 3.

3. The method of claim 2 wherein the steam-to-carbon ratio of the combined feed stream is from about 1.0 to about 2.5.

4. The method of claim 3 wherein the steam-to-carbon ratio of the combined feed stream is from about 1.0 to about 2.0.

5. The method of claim 1 wherein the combined feed stream is fed to the reforming reactor at a flow rate and steam-to-carbon ratio effective to stabilize the temperature of said the oxygen transport membrane reactor in a range from about 900 to 1000° C.

6. The method of claim 1 wherein the surface temperature of the oxygen transport membrane reactor is measured with at least one temperature measuring device selected from a thermocouple device, a pyrometer device, an optical camera-type device or combinations thereof.

7. The method of claim 6 wherein said temperature measuring device is a thermocouple device.

8. The method of claim 1 wherein the flow rate of the combined feed stream is decreased when the temperature of the oxygen transport membrane reactor falls below a predetermined target temperature within the target temperature range, and the flow rate of the combined feed stream is increased when the temperature of the oxygen transport membrane reactor increases above a predetermined target temperature within the target temperature range.

9. The method of claim 8 wherein the combined feed stream steam-to-carbon ratio is maintained constant while the flow rate of the combined feed stream is decreased or increased.

10. The method of claim 8 wherein the flow rate of the combined feed stream is decreased in an amount effective to allow the reactor temperature to increase at a rate of from about 0.5° C. per minute to about 10° C. per minute.

11. The method of claim 10 wherein the flow rate of the combined feed stream is decreased in an amount effective to allow the reactor temperature to increase at a rate of from about 1° C. per minute to about 5° C. per minute.

12. The method of claim 8 wherein the flow rate of the combined feed stream is increased in an amount effective to allow the reactor temperature to decrease at a rate of from about 0.5° C. per minute to about 10° C. per minute.

13. The method of claim 12 wherein the flow rate of the combined feed stream is increased in an amount effective to allow the reactor temperature to decrease at a rate of from about 1° C. per minute to about 5° C. per minute.

14. The method of claim 1 wherein the flow and temperature of the oxygen-containing stream to the reactor pack assembly is controlled such that the oxygen-to-carbon ratio of the produced syngas is maintained in a range of from about 0.45 to about 0.75.

15. The method of claim 1 wherein the wherein the combined feed stream is fed to the reforming reactor at a flow rate and a steam-to-carbon ratio effective to maintain the oxygen transport membrane reactor at a target temperature in a range of from about 950° C. to about 1000° C., and the flow and temperature of the oxygen-containing stream to the oxygen transport membrane reactor is controlled such that the oxygen-to-carbon ratio of the produced syngas is in a range of from about 0.45 to about 0.75.

16. A method for thermally-stabilizing an oxygen transport membrane-based reforming system during operation, wherein said system comprises at least one reforming reactor pack assembly, said assembly comprising two or more panel array modules, wherein each panel array module comprises a reforming panel comprising an array of reforming catalyst containing reforming reactors and an oxygen transport membrane panel comprising an array of catalyst-containing oxygen transport membrane reactors, the method comprising the steps of:

partially-reforming a combined feed stream comprising a hydrocarbon-containing feed stream and steam in the presence of heat in said reforming catalyst containing reforming reactor to produce a partially-reformed synthesis gas stream comprising hydrogen, carbon monoxide, carbon dioxide, steam and unreformed hydrocarbon gas;

feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream, to produce an oxygen permeate and an oxygen-depleted retentate stream;

reacting a portion of the partially-reformed synthesis gas stream with oxygen permeated through the at least one oxygen transport membrane reactor to produce the difference in oxygen partial pressure across the at least one oxygen transport membrane reactor and generate a steam-containing heated reaction product stream and heat;

transferring the heat generated as a result of the reaction via convection to the oxygen-depleted retentate stream and via radiation and convection to at least one catalyst-containing reforming reactor configured to produce a synthesis gas stream; and reforming the unreformed hydrocarbon gas in the partially-reformed synthesis gas stream in the presence of one or more catalysts contained in the oxygen transport membrane reactor and the heat to produce a synthesis gas product stream;

wherein the flow and temperature of the oxygen-containing stream to said oxygen transport membrane reactor is controlled such that the oxygen-to-carbon ratio of the produced syngas is in a target range of from about 0.45 to about 0.75.

17. The method of claim 16 wherein the flow and temperature of the inlet air flow stream to said reactor pack assembly is controlled such that the oxygen-to-carbon ratio of the produced syngas is in a target range of from about 0.55 to about 0.60.

18. The method of claim 16 wherein the temperature of the oxygen-containing stream is decreased when the oxygen-to-carbon ratio of the produced syngas falls below a predetermined target value within the target range.

19. The method of claim 16 wherein the temperature of the oxygen-containing stream is increased when the oxygen-to-carbon ratio of the produced syngas rises above a predetermined target value within the target range.

20. A method for thermally-stabilizing an oxygen transport membrane-based reforming system during operation, wherein said system comprises at least one reforming reactor pack assembly, said assembly comprising two or more panel array modules, wherein each panel array module comprises a reforming panel comprising an array of reforming catalyst containing reforming reactors and an oxygen transport membrane panel comprising an array of catalyst-containing oxygen transport membrane reactors, the method comprising the steps of:

partially-reforming a combined feed stream comprising a hydrocarbon-containing feed stream and steam in the presence of heat in said reforming catalyst containing reforming reactor to produce a partially-reformed synthesis gas stream comprising hydrogen, carbon monoxide, carbon dioxide, steam and unreformed hydrocarbon gas;

feeding the partially-reformed synthesis gas stream to a reactant side of a reactively-driven and catalyst-containing oxygen transport membrane reactor, wherein the oxygen transport membrane reactor is configured to separate oxygen from an oxygen-containing stream, to produce an oxygen permeate and an oxygen-depleted retentate stream;

reacting a portion of the partially-reformed synthesis gas stream with oxygen permeated through the at least one oxygen transport membrane reactor to produce the difference in oxygen partial pressure across the at least one oxygen transport membrane reactor and generate a steam-containing heated reaction product stream and heat; transferring the heat generated as a result of the reaction via convection to the oxygen-depleted retentate stream and via radiation and convection to at least one catalyst-containing reforming reactor configured to produce a synthesis gas stream;

reforming the unreformed hydrocarbon gas in the partially-reformed synthesis gas stream in the presence of one or more catalysts contained in the oxygen transport membrane reactor and the heat to produce a synthesis gas product stream;

determining an oxygen-to-carbon ratio of the synthesis gas product stream from composition measurements of the hydrocarbon-containing feed stream and the synthesis gas product stream;

wherein said method comprises feeding the combined feed stream to the reforming reactor at a flow rate and a steam-to-carbon ratio effective to maintain the oxygen-to-carbon ratio of the synthesis gas product stream in a target range of from about 0.45 to about 0.75.

* * * * *